US006753532B2

United States Patent
Pfleger

(10) Patent No.: US 6,753,532 B2
(45) Date of Patent: Jun. 22, 2004

(54) METHOD FOR DETECTING AND SUPPRESSING EXTRANEOUS RADIATION INFLUENCES IN RADIOMETRIC MEASUREMENTS

(75) Inventor: Manfred Pfleger, Bad Wildbad (DE)

(73) Assignee: Berthold Technologies GmbH & Co. KG, Bad Wildbad (DE)

( * ) Notice: Subject to any disclaimer, the term of this patent is extended or adjusted under 35 U.S.C. 154(b) by 107 days.

(21) Appl. No.: 10/091,117

(22) Filed: Mar. 6, 2002

(65) Prior Publication Data
US 2002/0181662 A1 Dec. 5, 2002

(30) Foreign Application Priority Data
Mar. 6, 2001 (EP) .......................................... 01105520

(51) Int. Cl.[7] ............................................... G01J 1/42
(52) U.S. Cl. .................. 250/395; 250/336.1; 250/357.1
(58) Field of Search ............................. 250/395, 336.1, 250/357.1

(56) References Cited

U.S. PATENT DOCUMENTS 3,246,150 A * 4/1966 Stoddart et al. ............ 250/369
4,755,677 A * 7/1988 Blincow et al. .......... 250/357.1
5,218,202 A * 6/1993 Evers ....................... 250/252.1
5,646,409 A 7/1997 Leisinger et al.
6,104,033 A * 8/2000 Graeme .................... 250/357.1
6,548,814 B1 * 4/2003 Gronli ...................... 250/357.1

FOREIGN PATENT DOCUMENTS

DE 26 22 223 A1 12/1977
DE 197 11 124 A1 11/1997

* cited by examiner

Primary Examiner—David Porta
Assistant Examiner—Christine Sung
(74) Attorney, Agent, or Firm—Browdy and Neimark

(57) ABSTRACT

A method of detecting and suppressing extraneous radiation influences in radiometric measurements utilizes, in addition to the measurement channel that extends at least essentially over the entire usable pulse amplitude spectrum, at least one substitute channel that encompasses only a fractional range of the usable pulse amplitude spectrum. The measurement channel (MK) and substitute channel (EK) are calibrated in terms of the same variables, such as fill level or volume. A comparison between the measurement values, defined by the respective pulse rates of the measurement channel and substitute channel, is brought about in such a way that the value of the linkage varies significantly if extraneous radiation occurs.

8 Claims, 21 Drawing Sheets

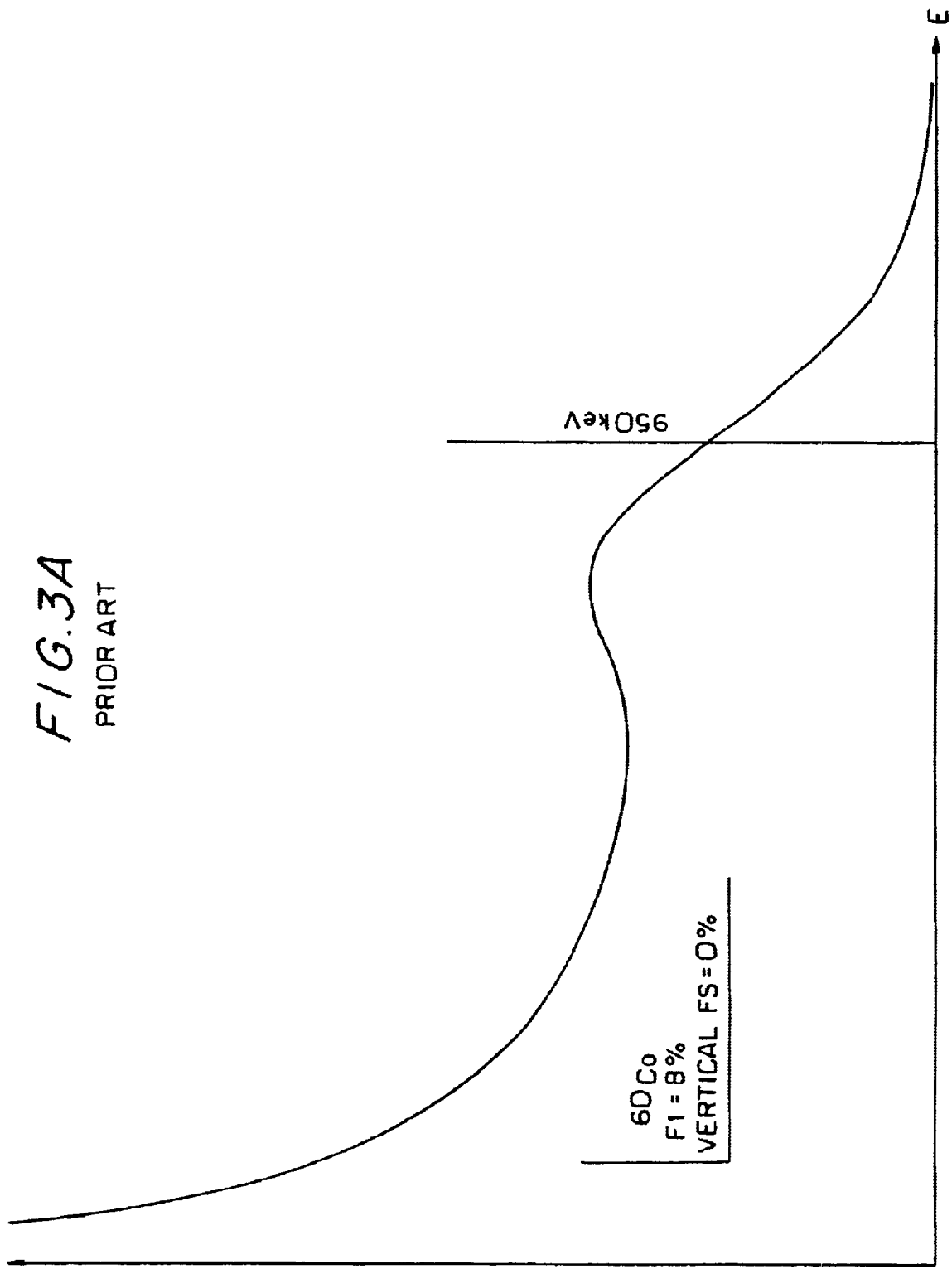

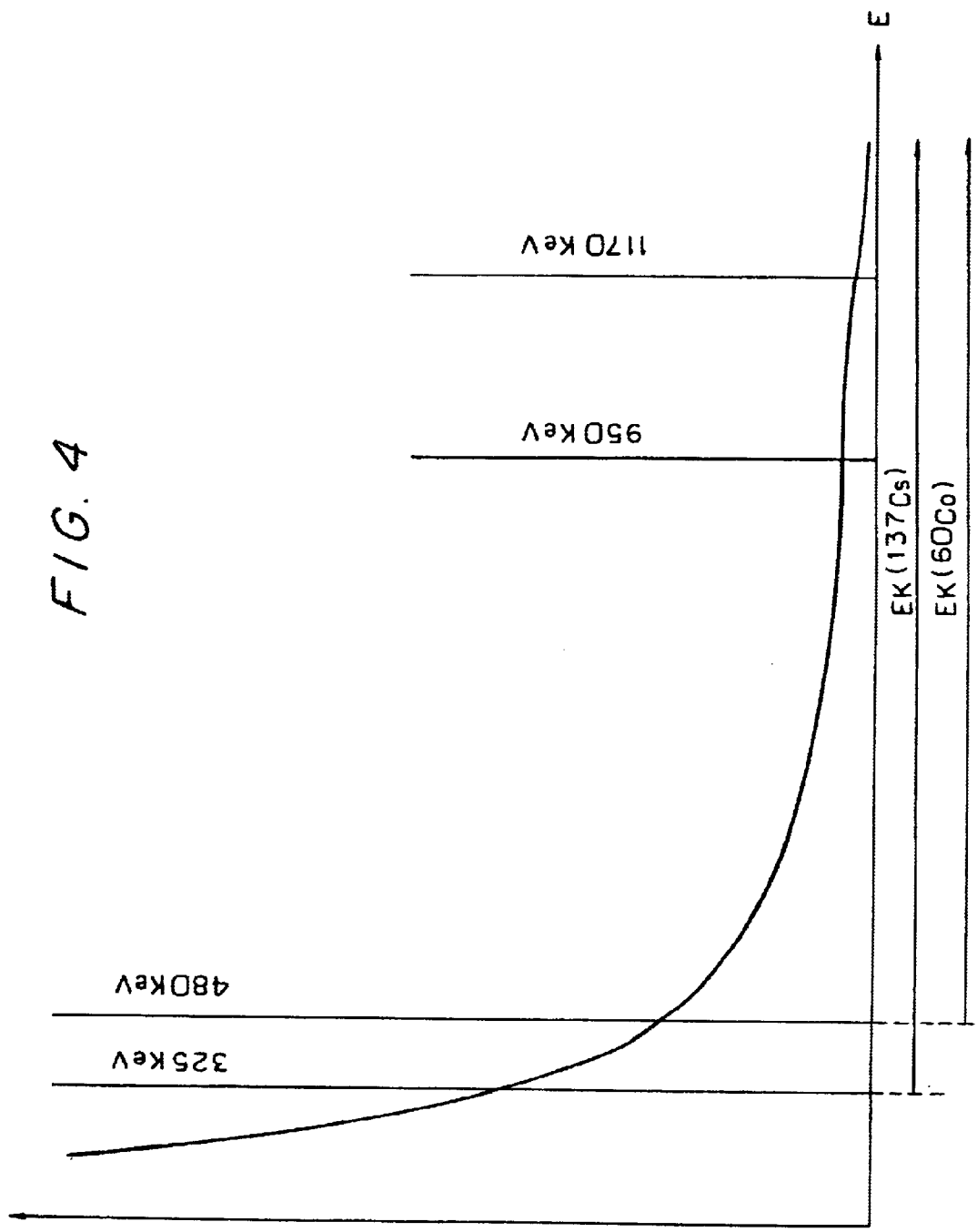

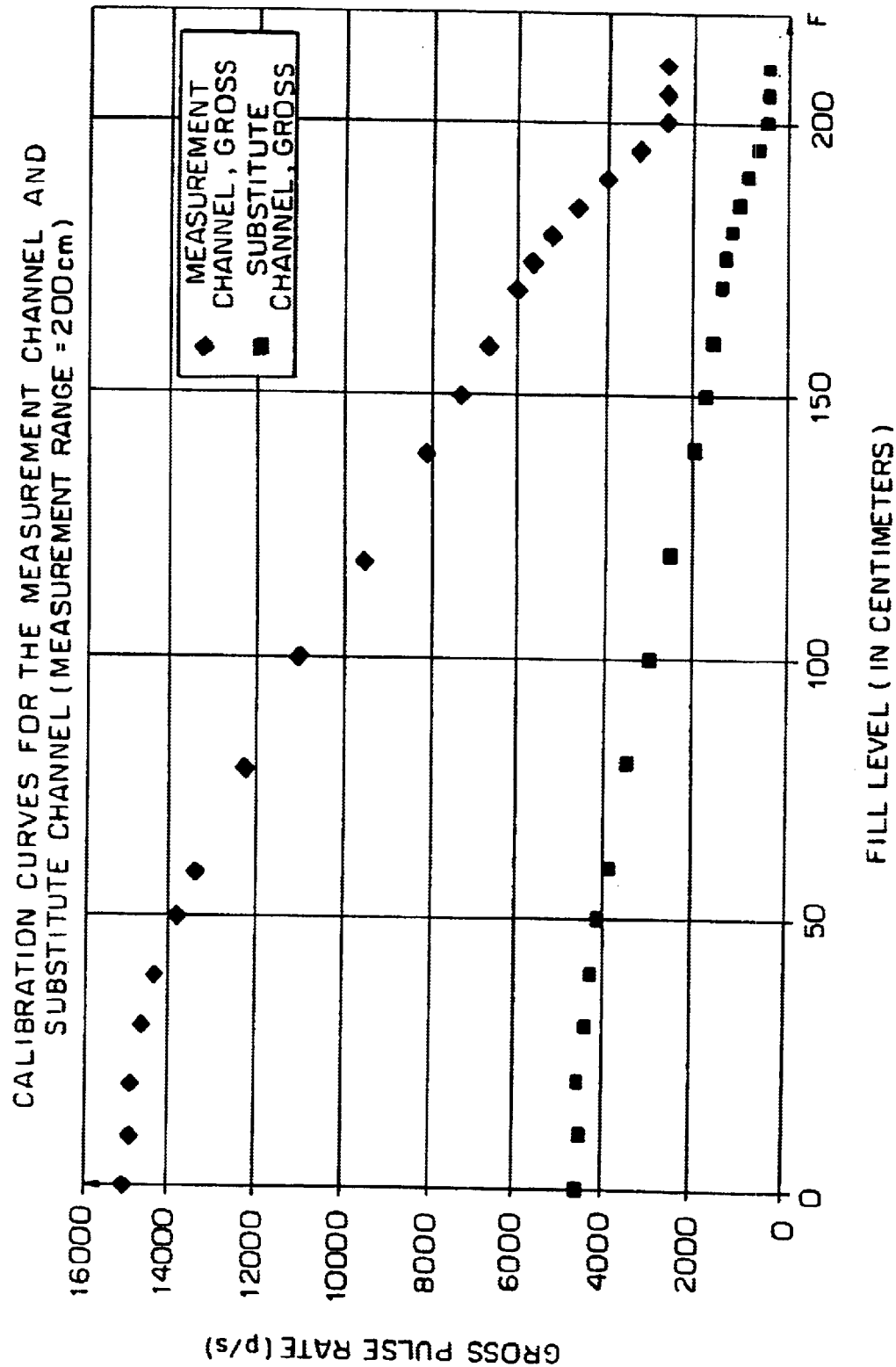

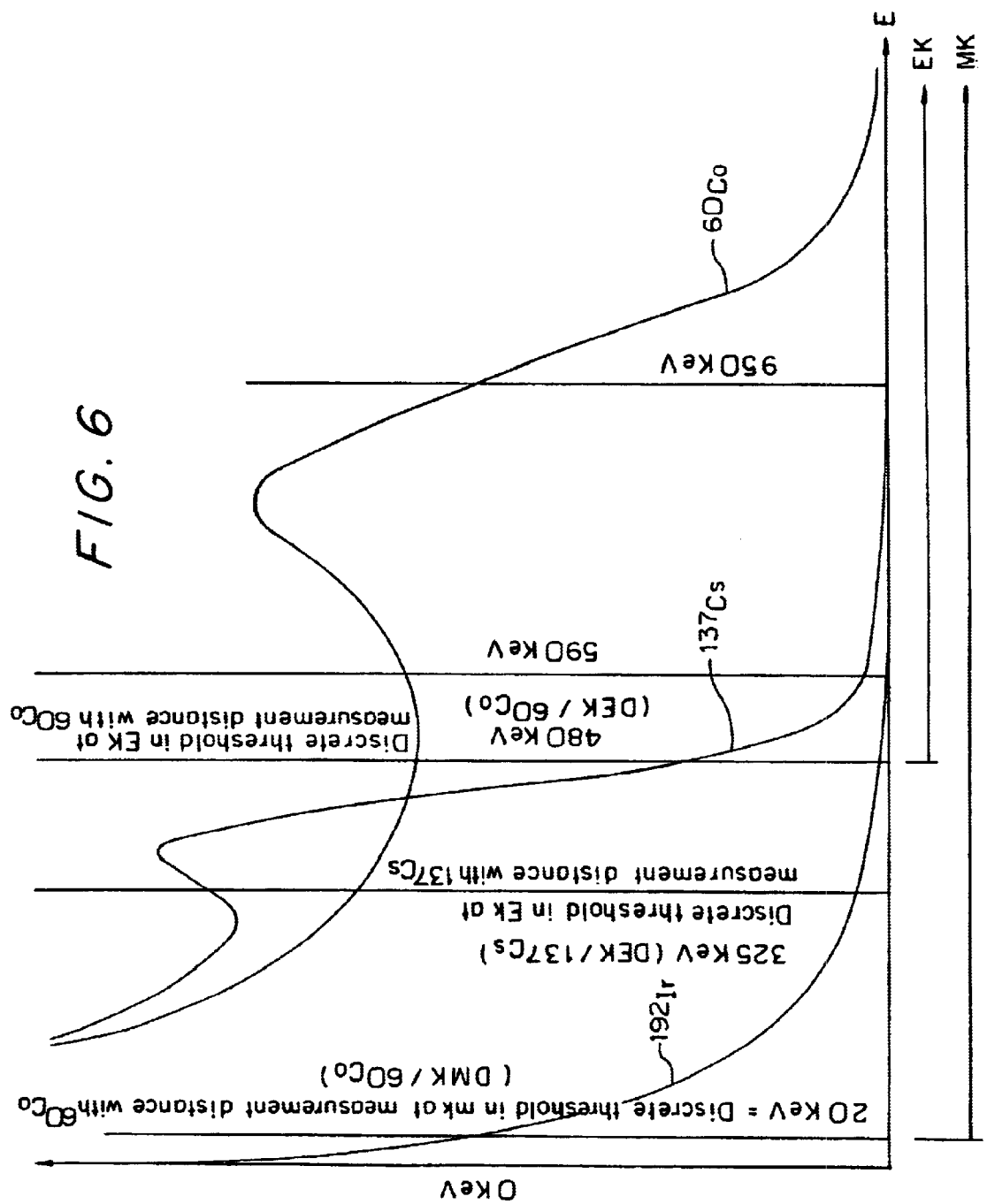

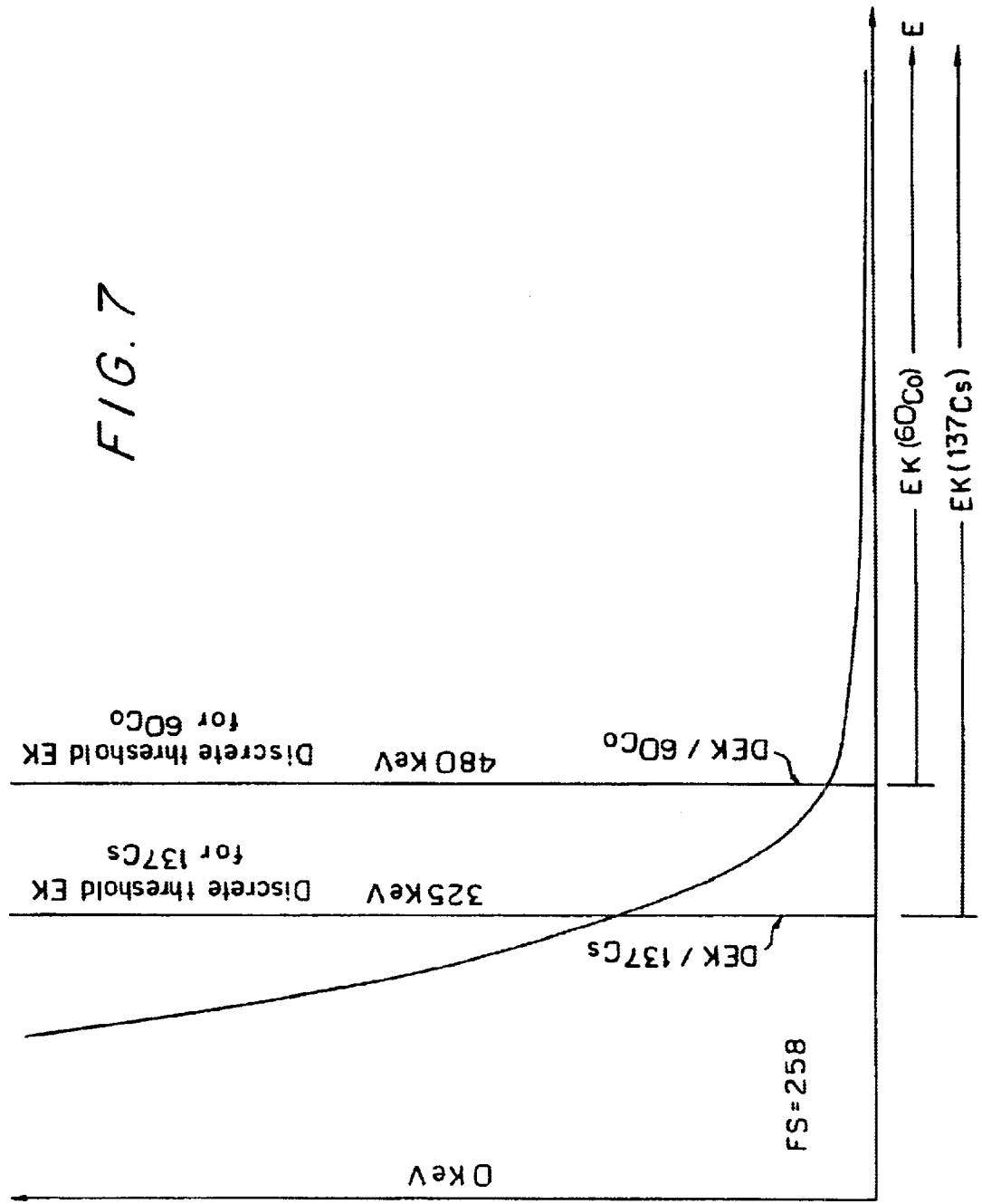

METHOD FOR DETECTING AND SUPPRESSING EXTRANEOUS RADIATION INFLUENCES IN RADIOMETRIC MEASUREMENTS

BACKGROUND OF THE INVENTION

The invention relates to a method for detecting and suppressing extraneous radiation influences in radiometric measurements.

1. Field of the Invention

Radiometric measurement paths can be impaired considerably by changes in the intensity of the ambient radiation, as can occur for instance in testing of weld seams using x-ray sources or radioisotopes. In fill level measurements, this additional radiation incorrectly indicates an overly low value for the fill level, which can easily cause the containers to overflow. Systems with plastic rod detectors are especially vulnerable to such interference factors, because these detectors as a rule are operated without shielding and at the same time have a high response sensitivity, because of their relatively large dimensions.

2. Prior Art

In order to detect the occurrence of extraneous radiation influences and initiate appropriate safety provisions, additional detectors (extraneous radiation detectors) are sometimes disposed outside the radiation field of the radiometric measurement path, so that changes in the ambient radiation can be ascertained independently of changes in the intensity of the measurement path radiation.

Another method is to determine the occurrence of an extraneous radiation influence by way of specific changes (such as additional photo peaks) in the pulse level spectrum of the detector of the radiometric measurement path itself. This requires a detector whose spectrum has clearly pronounced photo peaks that allow conclusions to be drawn about the radiation energy, as is the case for instance in detectors with NaI(Tl) scintillators that are often used.

In plastic scintillators, no photo peaks occur, but from the shape of the spectra resulting from the Compton edges positioned in them, conclusions about gamma energies contained because of extraneous radiation in the radiation spectrum can be drawn.

For this purpose, for the sake of detecting synthetic gamma radiation by means of a liquid or plastic scintillator, it is known, for example from German Patent Disclosure DE 197 11 124 A1, to form the ratio of the pulse amplitude distribution of the natural gamma radiation and that of the expected or suspected synthetic gamma radiation, by setting two pulse amplitude thresholds pertaining to the pulse amplitudes, the thresholds being typical for the maximum or minimum energies that occur. From a measured counting rate ratio from the measured counting rates of the two channels for the two thresholds and from a comparison with a reference counting rate ratio in the absence of synthetic gamma radiation, it can be concluded that such synthetic gamma radiation is present if the counting rate ratio of the two channels, each extending to the respective set threshold, deviates from the reference counting rate ratio by a predeterminable amount. The goal is reached when the synthetic gamma radiation sought or suspected is detected; quantitative measurements are not contemplated.

From the course over time of the intensity, and in particular the speed of changes in intensity, it is also possible to conclude that undesired radiation factors are occurring. One such procedure is described in European Patent Disclosure EP 0 615 626 B1: Here the term "extraneous radiation" is understood to mean the influence of sporadically active radiation sources, as can happen in materials testing as a function of the external measurement conditions. In this version, an atypical course over time (for instance, a rapid rise) in the pulse counting rates of the photomultiplier downstream of the plastic scintillator leads to the conclusion that extraneous radiation is present. On the precondition that for this extraneous radiation a stable value after a transition time has elapsed is assumed, it is possible once this new, stabilized value is reached to calculate a correction value, with which the measurement can then be continued. Thus for a certain "sequence characteristic" of the extraneous radiation, this method makes it possible to continue the measurement, but in principle it is limited to assessing a significant change in the pulse counting rate as a typical sign for the appearance of the extraneous radiation as defined above. As soon as the change in the pulse counting rate from an extraneous radiation source is on the order of magnitude of the "regular" pulse rate changes that occur during measurement, for instance when agitator mechanisms are used in the measurement path, this method can no longer be employed, since then it is no longer possible to set thresholds for the pulse rate change which when overshot or exceeded make it possible to draw a reliable conclusion about the incidence of extraneous radiation.

In simpler cases, extraneous radiation influence can also be detected by measurement values that are significantly above the measurement values in unimpeded operation or by an overdrive of the detector as a result of overly high radiation intensities; however, not all undesired extraneous radiations can be detected in this way.

Typical fill level measurement systems are basically constructed in accordance with FIG. 1 or FIG. 2. In their basic versions, they comprise either a point-type radiation source 2 combined with a detector 4 having a rod-shaped scintillator 5 (FIG. 1), or with a rod-shaped radiation source 9 combined with a detector 4 having a point-type scintillator 8 (FIG. 2). The two arrangements can also be combined and can be constructed with a plurality of radiation sources.

The exemplary embodiment of FIG. 1 is a fill level measurement system for a tank 1, comprising a point-type radiation source 2 and a scintillation detector, or probe, 4 with a rod-shaped plastic scintillator 5.

The scintillation detector 4 is connected to an evaluation device 7 via a cable 6. The evaluation device 7 can also be integrated with the detector.

In such arrangements, as the fill level increases, absorption and scattering of the measurement radiation through the medium filling the tank 1 increases, causing the intensity of the radiation striking the detector to decrease as the fill level rises.

As can be seen in FIGS. 3A–3E, the spectra produced for different fill levels by a $^{60}$Co radiator are such that as the fill level F1 . . . F5 increases, the Compton edge at 950 keV becomes shallower and shallower, the Compton peak is less and less pronounced, and the proportion of small pulses is higher and higher.

This can be explained by the fact that with an increasing fill level, the proportion of scattered radiation and zero effect radiation increases; the energy of the scattered radiation is intrinsically less than the energy of the primary measurement path radiation; and the zero effect spectrum (FIG. 4) rises comparatively sharply toward low energies.

In order to achieve the highest possible counting yield as well as high stability of the counting yield in the measurement channel, as much as possible of the entire usable part of the spectrum is utilized to derive the measurement values. As a consequence, extraneous radiation that may occur influences the counting rate in the measurement channel even if its energy is less than that of the measurement path radiation.

BRIEF SUMMARY OF THE INVENTION

The present invention improves the basic method disclosed in DE 197 11 124 A1 in such a way that when there are changes in the intensity of the ambient radiation in operation of a radiometric measurement path, extraneous radiation can reliably be detected with plastic scintillators, and if possible the measurement outcome can be corrected.

This object is attained by a method for detecting and suppressing extraneous radiation influences in radiometric measurements in which measurements are performed over a useable pulse amplitude spectrum, comprising:

defining a measurement channel (MK) that extends at least essentially over the entire usable pulse amplitude spectrum;

defining at least one substitute channel (EK) that encompasses only a fraction of the usable pulse amplitude spectrum;

calibrating the measurement channel (MK) and substitute channel (EK) in terms of identical variables;

defining a relation between the measurement values, defined by the respective pulse rates of the measurement channel (MK) and substitute channel (EK) such that a substantial variation from a nominal value occurs in the value of the relation when extraneous radiation is detected; and performing a radiometric measurement and determining the value of the relation for the measurement values obtained during the measurement.

One essential concept of the invention is that upon detection of extraneous radiation by comparison of the calibrated measurement values in a suitably specified measurement channel of the pulse height spectrum, the contribution of this channel to the overall outcome of measurement is eliminated, and instead the measurement outcome of the substitute channel, formed by the pulse height spectrum located outside a threshold defining the substantial variation, is weighted with a calibration factor, whose value is obtained from a calibration measurement in the absence of extraneous radiation. Although this does provide a statistically dictated loss of precision of the outcome of measurement, since the evaluation of pulses from a blanked-out pulse amplitude range is omitted, nevertheless it makes it possible to continue the measurement using the measurement value of the substitute channel, weighted by the calibration factor.

BRIEF DESCRIPTION OF THE DRAWINGS

Taking a radiometric fill level measurement as an exemplary embodiment, the method of the invention will now be described in conjunction with the following:

FIGS. 3A–E show typical spectra when a $^{60}$Co radiator is used, at various fill levels F in a fill level measurement system of FIG. 1 or FIG. 2.

FIG. 4 shows the amplitude spectrum of the zero effect radiation in a fill level measurement system of FIG. 1 or FIG. 2.

FIG. 5 is a diagram showing a calibration function for the measurement channel and substitute channel according to the invention.

FIG. 6 is a diagram showing amplitude spectra and discriminator thresholds for $^{60}$Co, $^{137}$Cs and $^{192}$Ir for the substitute channel in a $^{60}$Co measurement path.

FIG. 7 is a diagram showing an expanded $^{192}$Ir spectrum with discriminator thresholds for $^{60}$Co and $^{137}$Cs.

DETAILED DESCRIPTION OF THE INVENTION

According to the invention, in addition to the measurement channel MK, a substitute channel EK is defined in such a way that the sensitivity to extraneous radiation in that channel is as low as possible. This is achieved at the cost of a response sensitivity in the substitute channel EK that is reduced to approximately 20%.

The derivation of the fill level F from the pulse rate measured by the scintillator is done by means of a calibration function, an example of which is represented by calibration curves in FIG. 5. This function can be determined by calculation and/or measurement. The influences of scattered radiation and zero effect radiation are thus included.

FIG. 6 shows the amplitude spectra of $^{60}$Co, $^{137}$Cs and $^{192}$Ir in comparison. It can be seen that $^{192}$Ir does not scatter into the upper part of the $^{60}$Co spectrum, and that the majority, or "center of gravity", of the $^{137}$Cs spectrum is markedly above the $^{192}$Ir spectrum.

The definition, performed according to the invention, of the pulse spectrum ranges used is shown in FIG. 6, taking $^{192}$Ir as an example of an extraneous radiation source. Of the extraneous radiation sources typically used, $^{192}$Ir has the highest energy.

The other typical radiation sources, such as $^{90}$Se, are lower in terms of energy and are therefore not as problematic. FIG. 7 shows the amplitude spectrum of $^{192}$Ir with the vertical axis exaggerated eight times. It can be seen that practically no $^{192}$Ir radiation scatters into the energy range above 480 keV any longer.

In accordance with the course of these spectra, a discriminator threshold DMK of about 20 keV is recommended for the measurement channel MK, and for the substitute channel EK, a discriminator threshold DEK of about 480 keV, if $^{60}$Co is used, or 325 keV if $^{137}$Cs is used as the measurement radiator, is recommended, as shown in FIG. 6.

With these settings, the conditions shown in FIGS. 8–15 result, shown as plateau curves for the aforementioned radiation sources, $^{60}$Co and $^{137}$Cs, and discriminator thresholds DMK and DEK.

Figure 16:
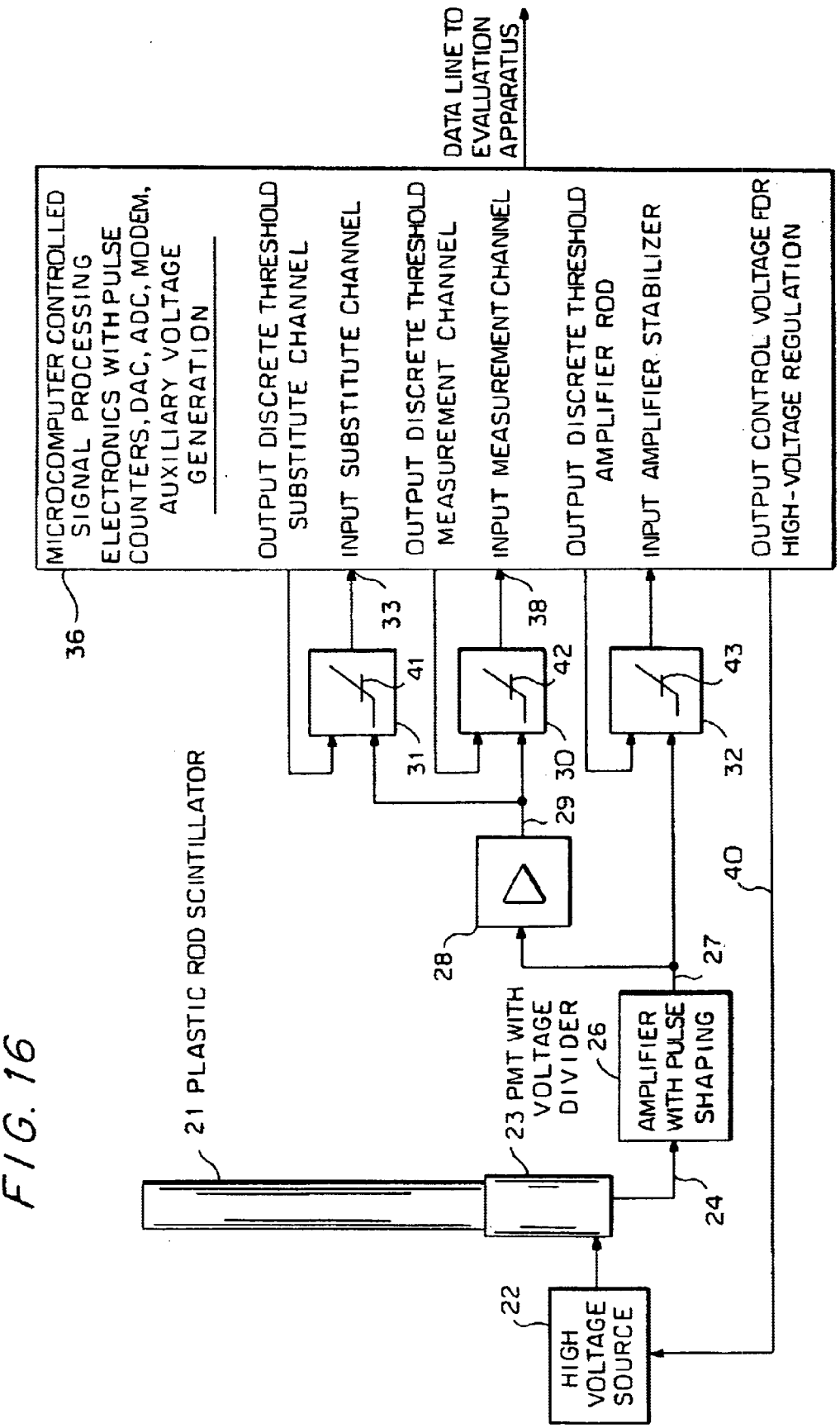
FIG. 16 is a block circuit diagram of an arrangement for classifying the measurement values in the measurement channel and the substitute channel.

FIG. 16 is a block circuit diagram of a signal processing circuit in the scintillation probe 4. The scintillation probe 4 includes a plastic rod scintillator 21, with a length corresponding to the measurement range, and a photomultiplier with a voltage divider 23 that is supplied from a high voltage source 22. The anode pulses 24 are amplified and shaped in the usual way, by means of an amplifier with pulse shaping 26. The output pulses 27 from amplifier 26 are fed directly, or via a further amplifier stage, to the inputs of the integral discriminators 30, 31, 32 used to limit the spectral ranges.

The integral discriminator 32 serves in a known way to trigger a closed-loop control circuit for stabilizing the amplitude of the scintillation pulses. Its response threshold 43 is set such that only about 5% of the total pulse rate is detected. The amplitude setting is effected via a control voltage 40, by way of which the output voltage of the high-voltage source 22 is set. To achieve adequately high amplitude dynamics, the amplifier pulses 27 are amplified once again by means of the amplifier 28. With the amplified pulses 29 from amplifier 28, the two integral discriminators 30 and 31 are then triggered.

Via the integral discriminator 30, the analog pulses from the range of the pulse height spectrum associated with the measurement channel MK are detected and converted into digital pulses for triggering the input 38 of the measurement channel. The discriminator threshold 42 (DMK) is set for this purpose to a level corresponding to about 20 keV, so that in the measurement channel MK, practically all the pulses of the usable pulse-height range are detected.

Via the integral discriminator 31, the input 33 of the substitute channel EK is triggered. To that end, the discriminator threshold 41 (DEK) is set to a level corresponding to about 480 keV for $^{60}$Co, or about 325 keV for $^{137}$Cs, so that in designing for $^{60}$Co, practically no $^{192}$Ir pulses, and in designing for $^{137}$Cs only a proportion of the $^{192}$Ir pulses, scatter into the substitute channel (see FIG. 6).

The further signal processing is done by means of a computer-controlled electronic unit 36.

Figure 1:
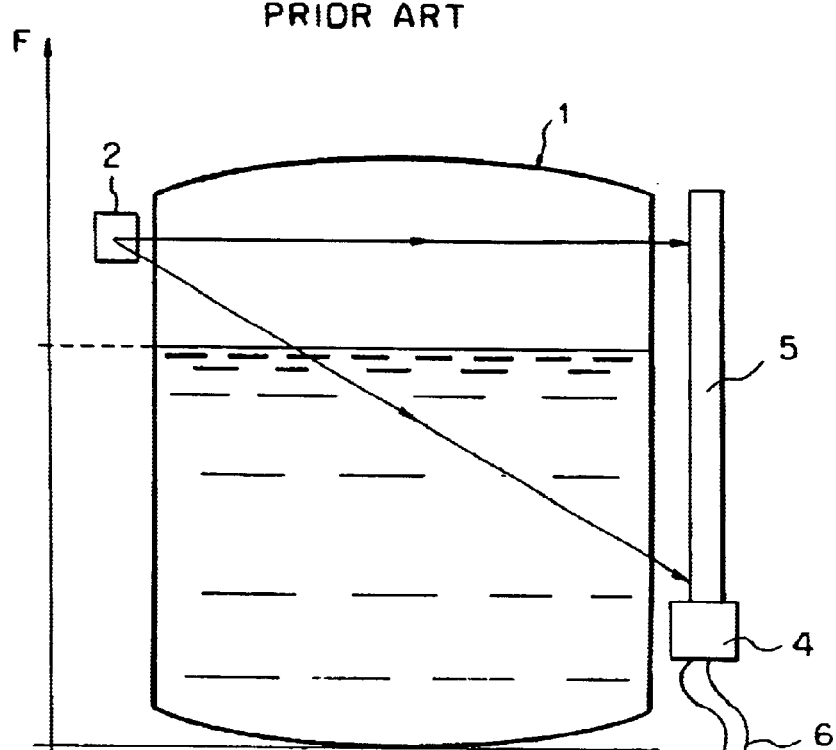
FIG. 1 is a pictorial elevational view of the layout of a first fill level measurement system of the prior art.
Figure 2:
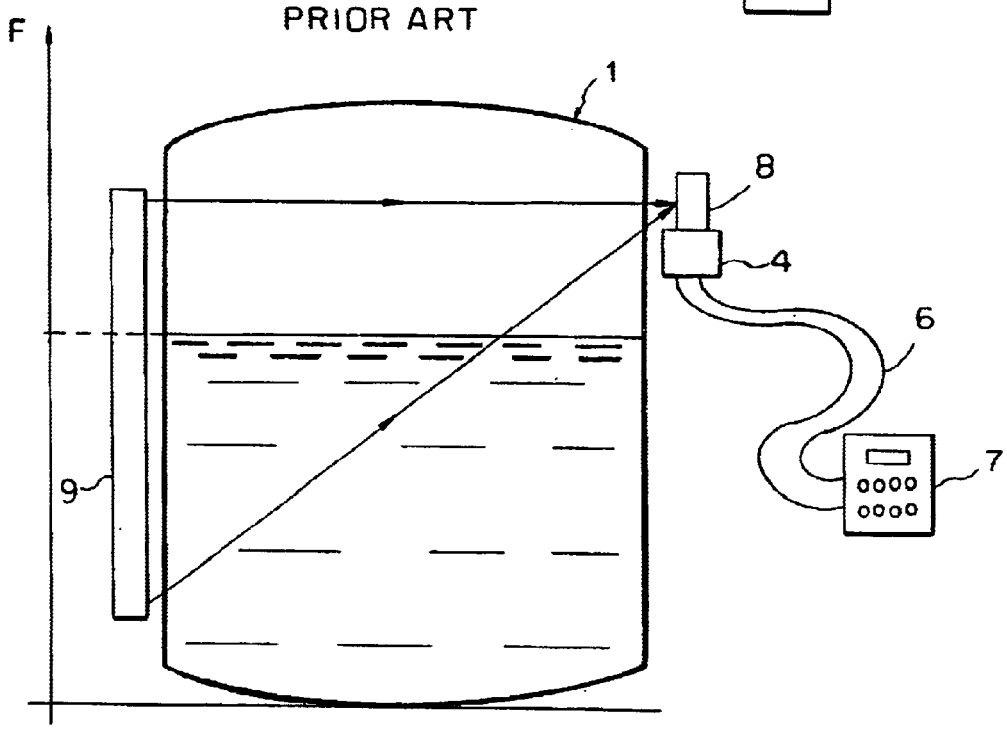
FIG. 2 is a view similar to that of FIG. 1 of the layout of a second fill level measurement system of the prior art.
Figure 3B:
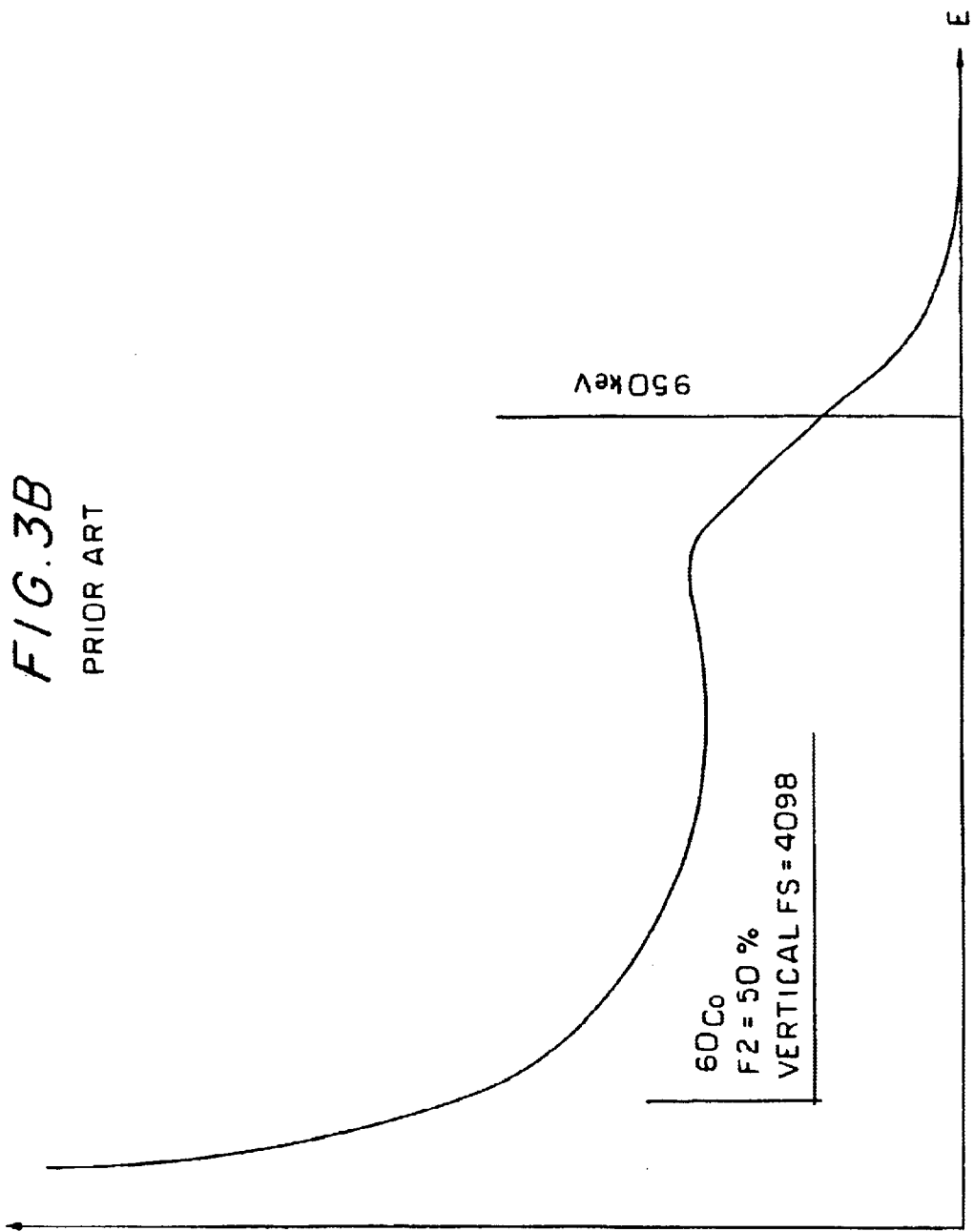
Figure 3C:
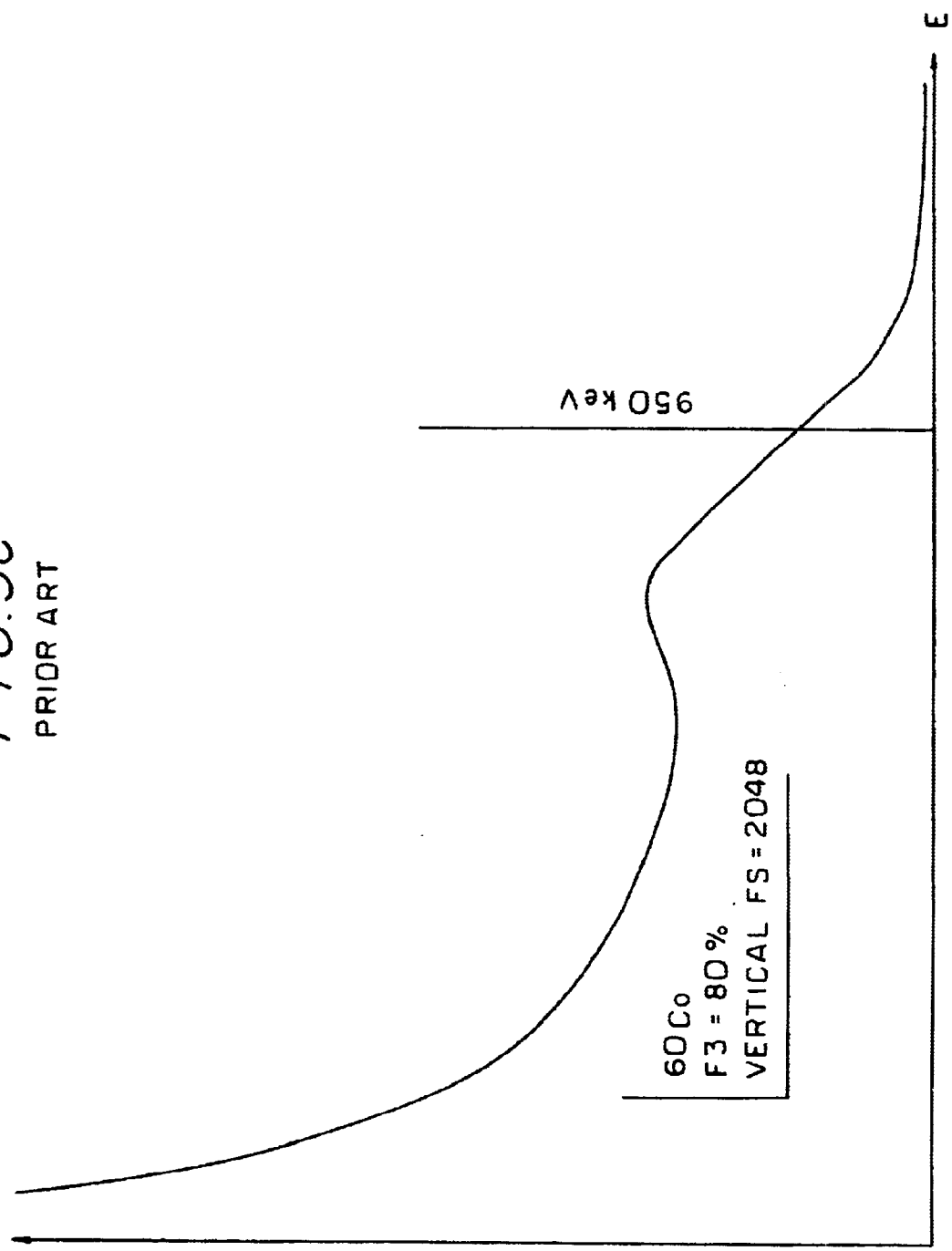
Figure 3D:
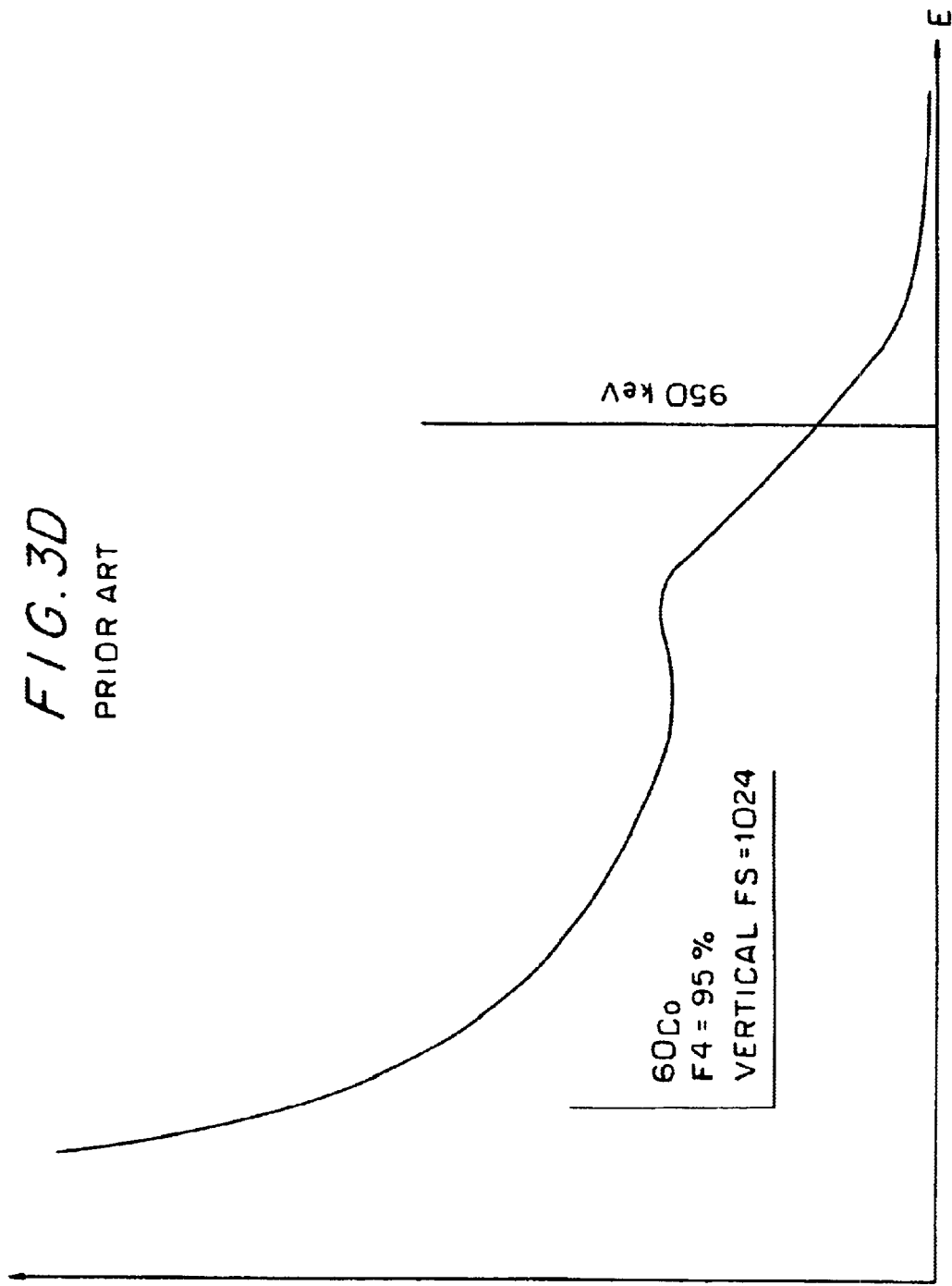
Figure 3E:
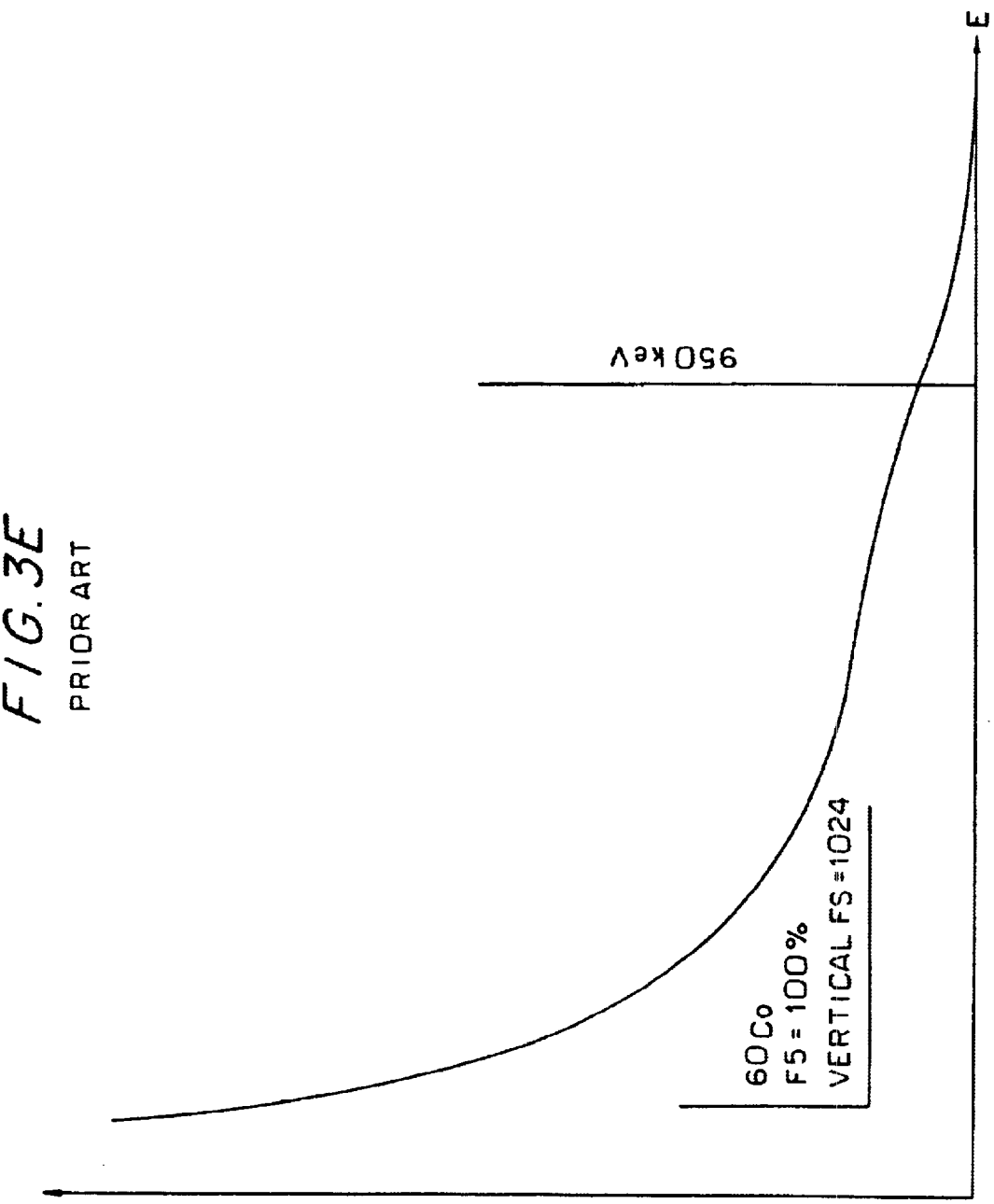
Figure 8:
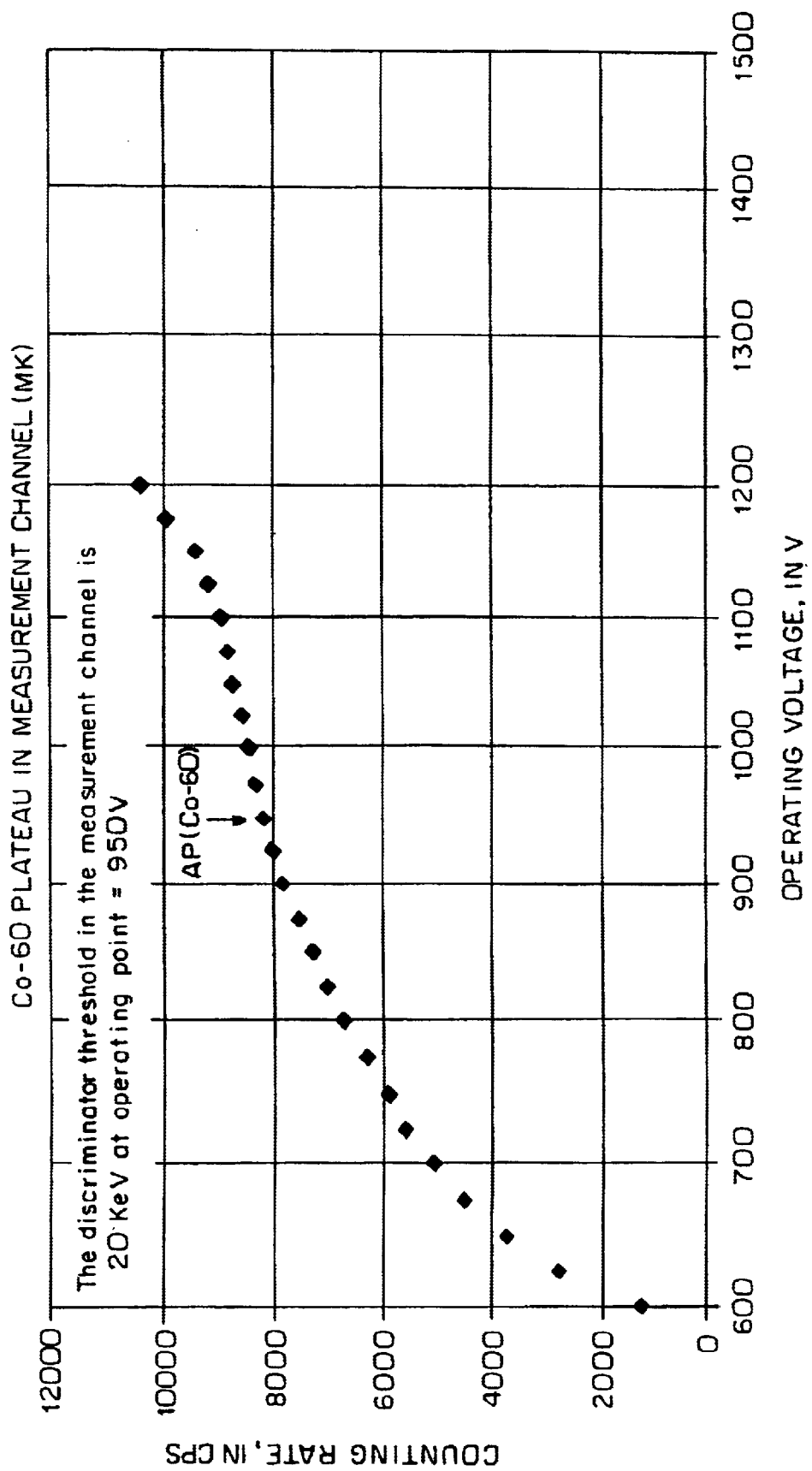
FIGS. 8–15 are diagrams showing typical plateau measurements, for $^{60}$Co, $^{137}$Cs $^{192}$Ir and zero effect radiation in the measurement channel and in the substitute channel, respectively.
Figure 9:
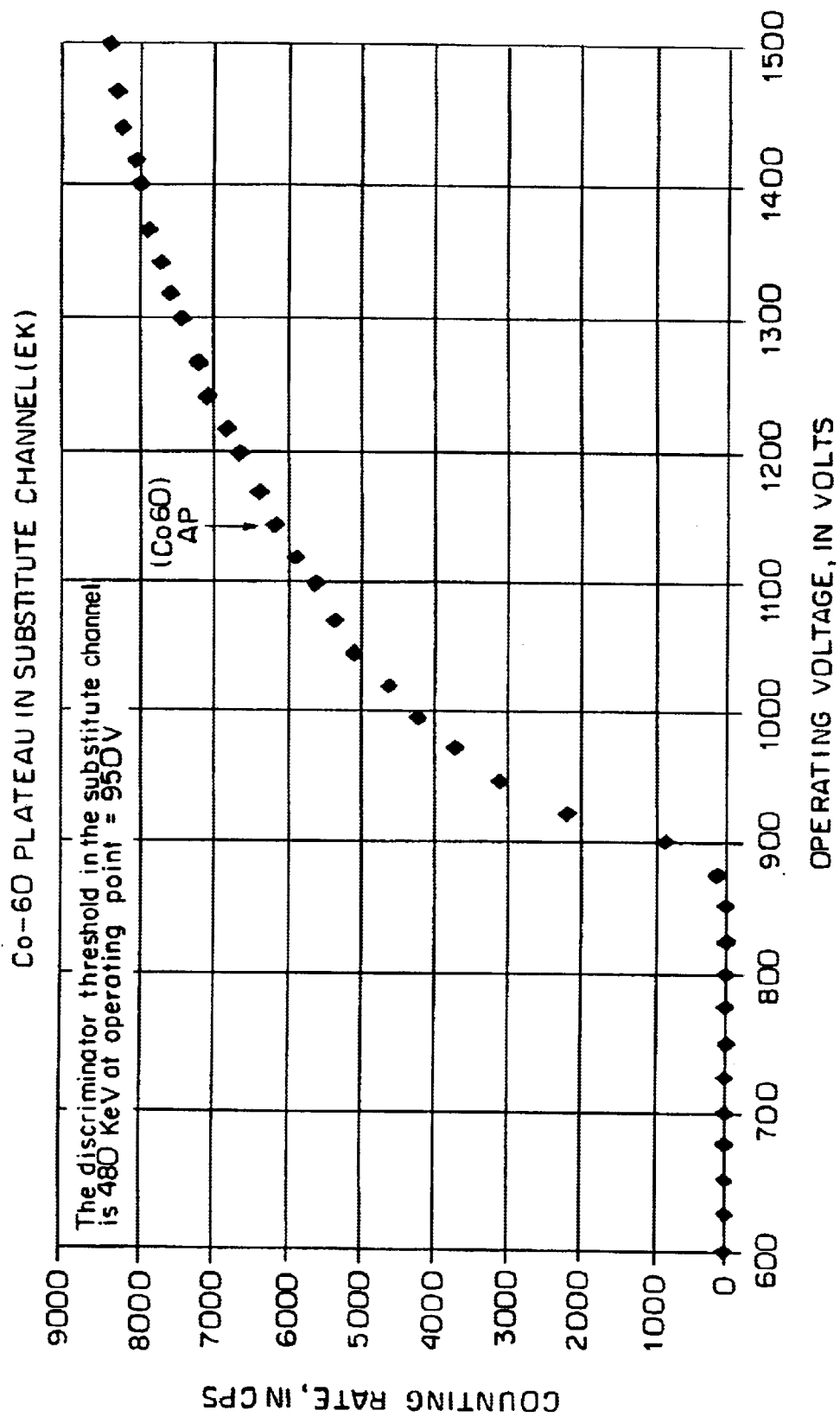
Figure 10:
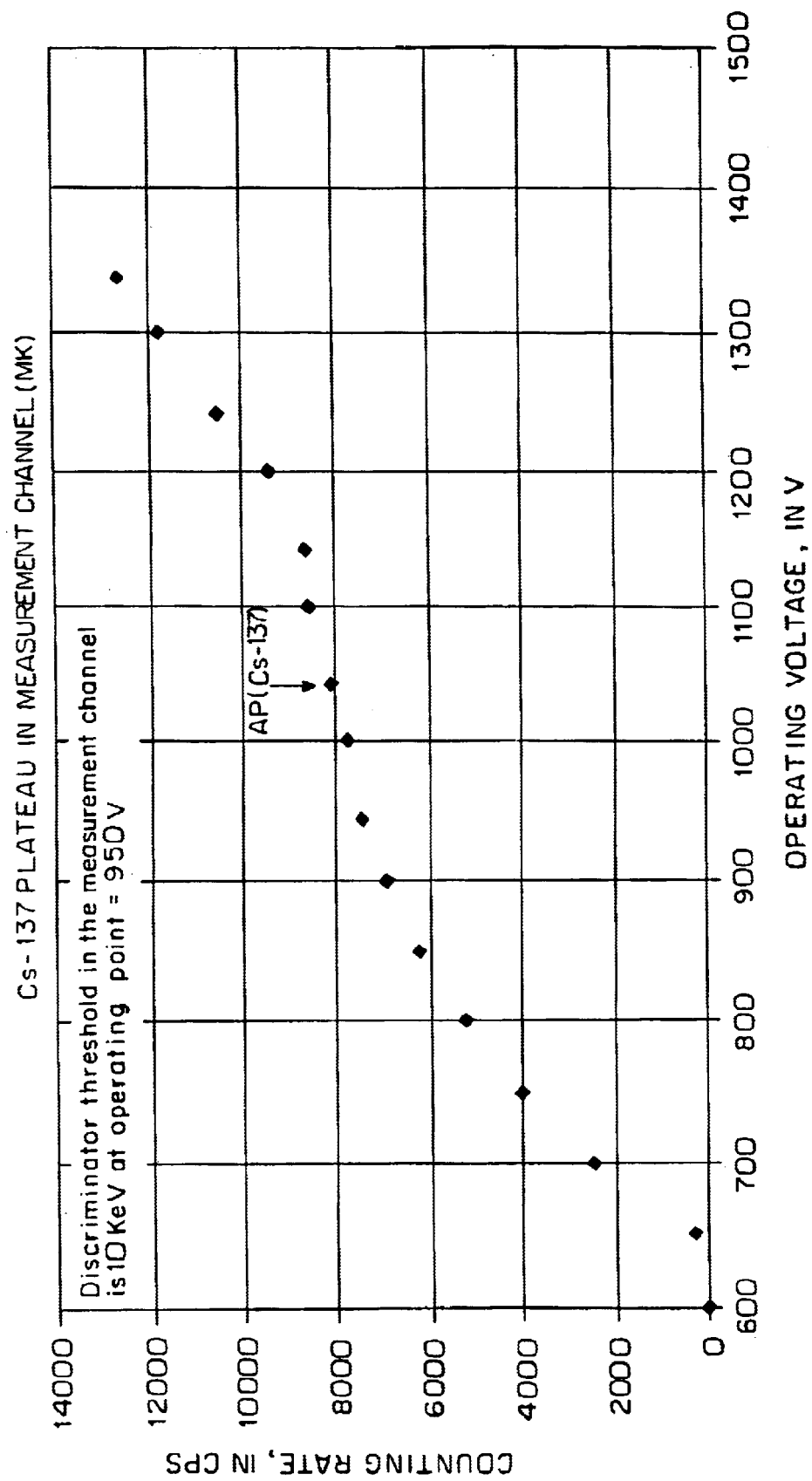
Figure 11:
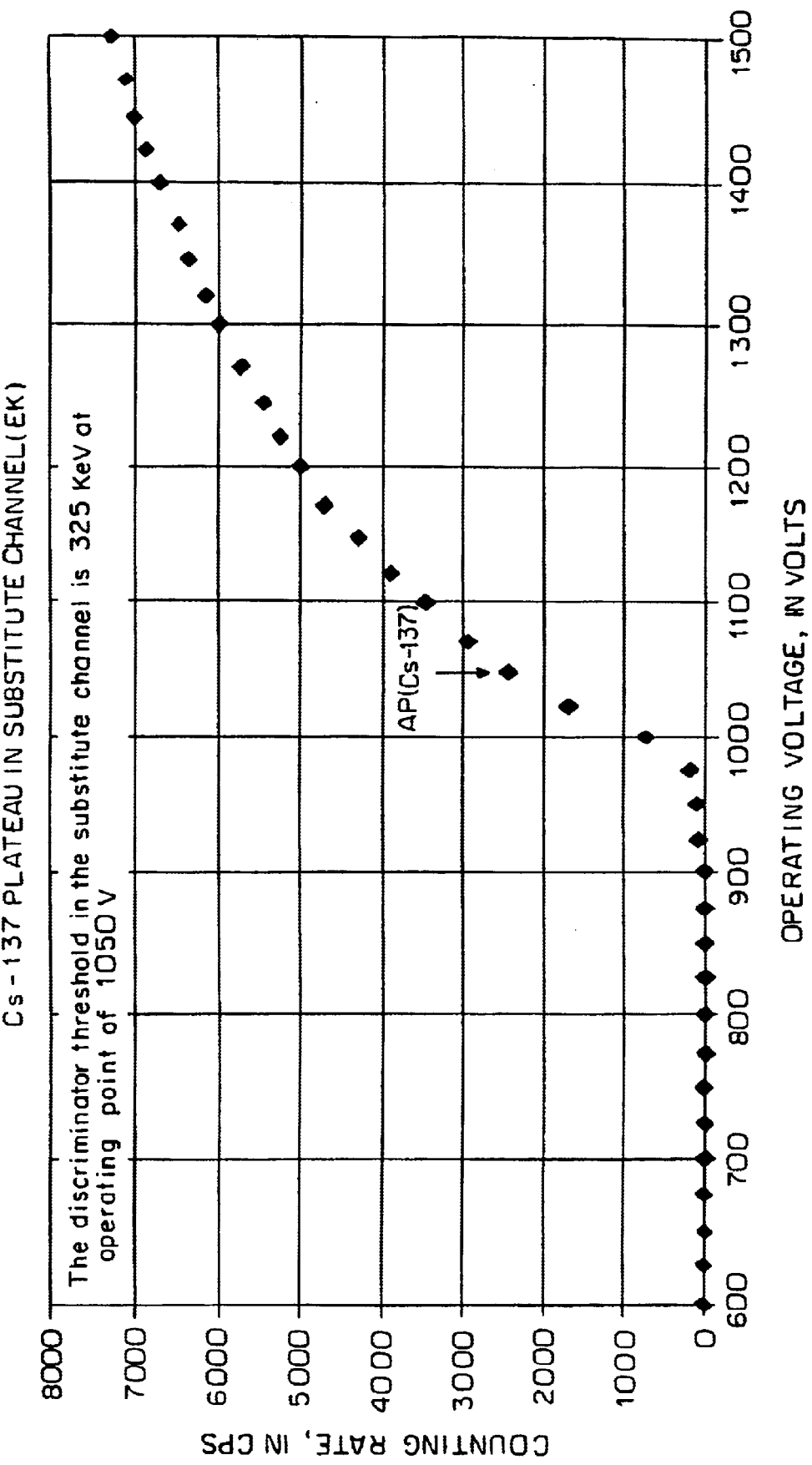
Figure 12:
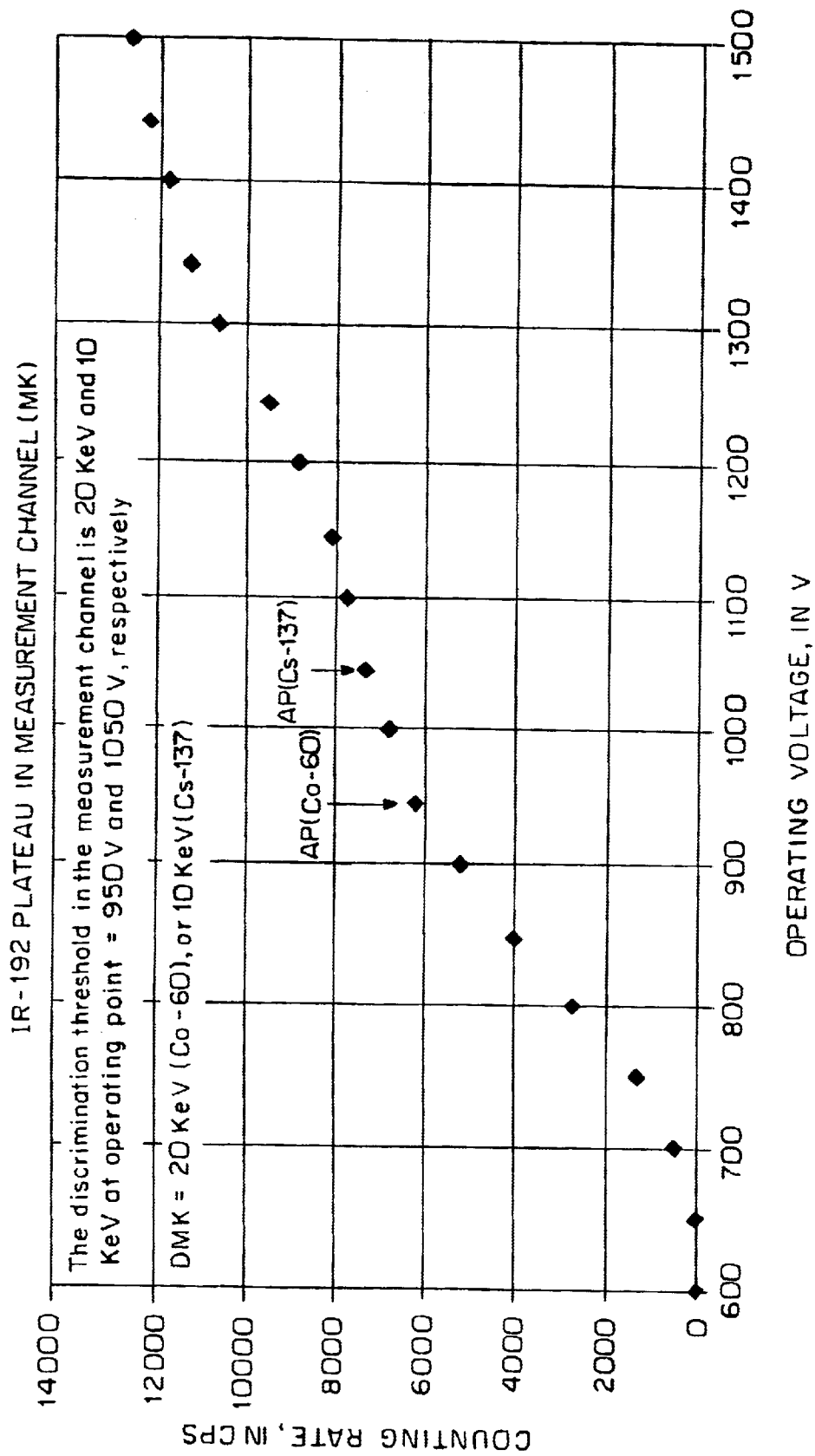
Figure 13:
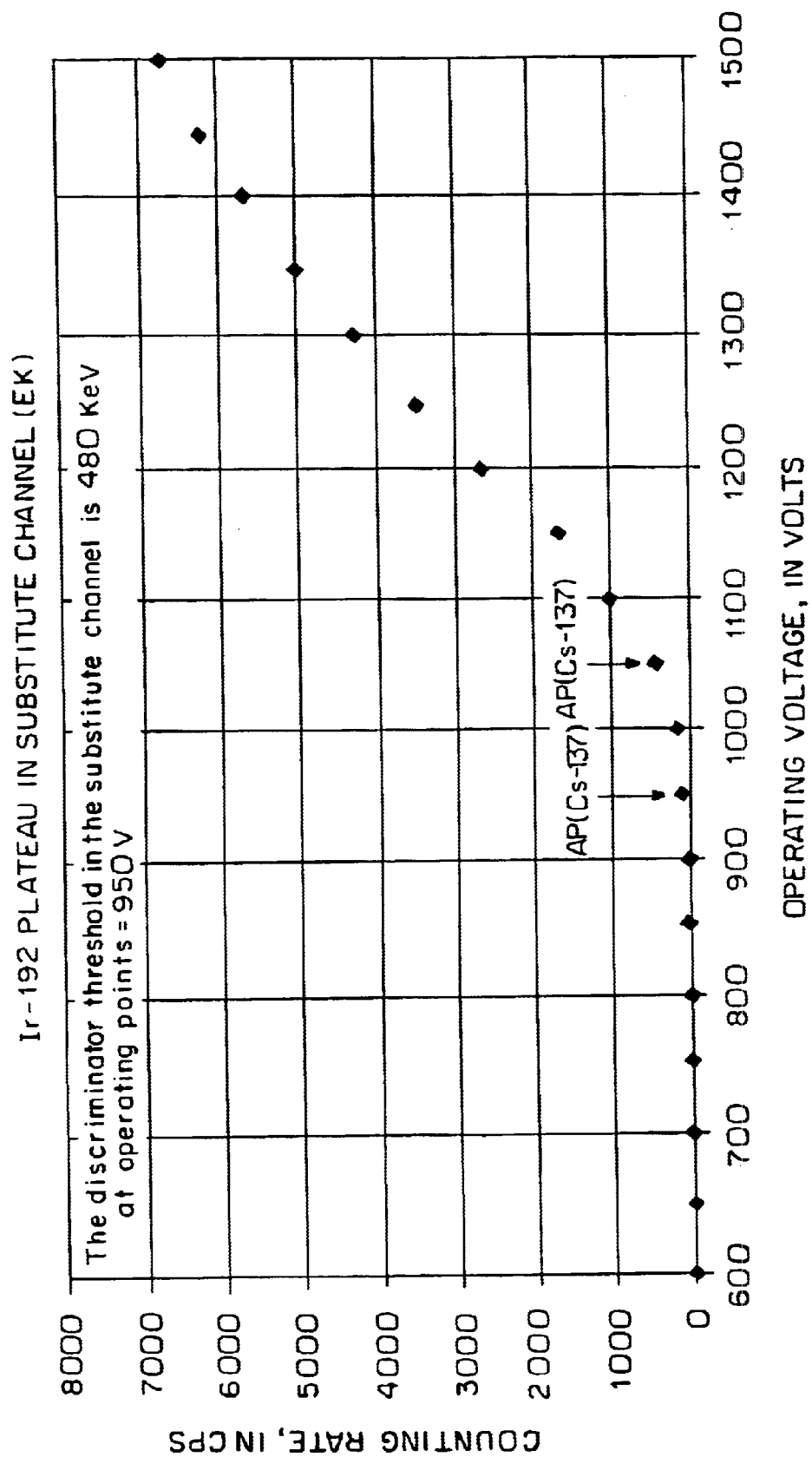
Figure 14:
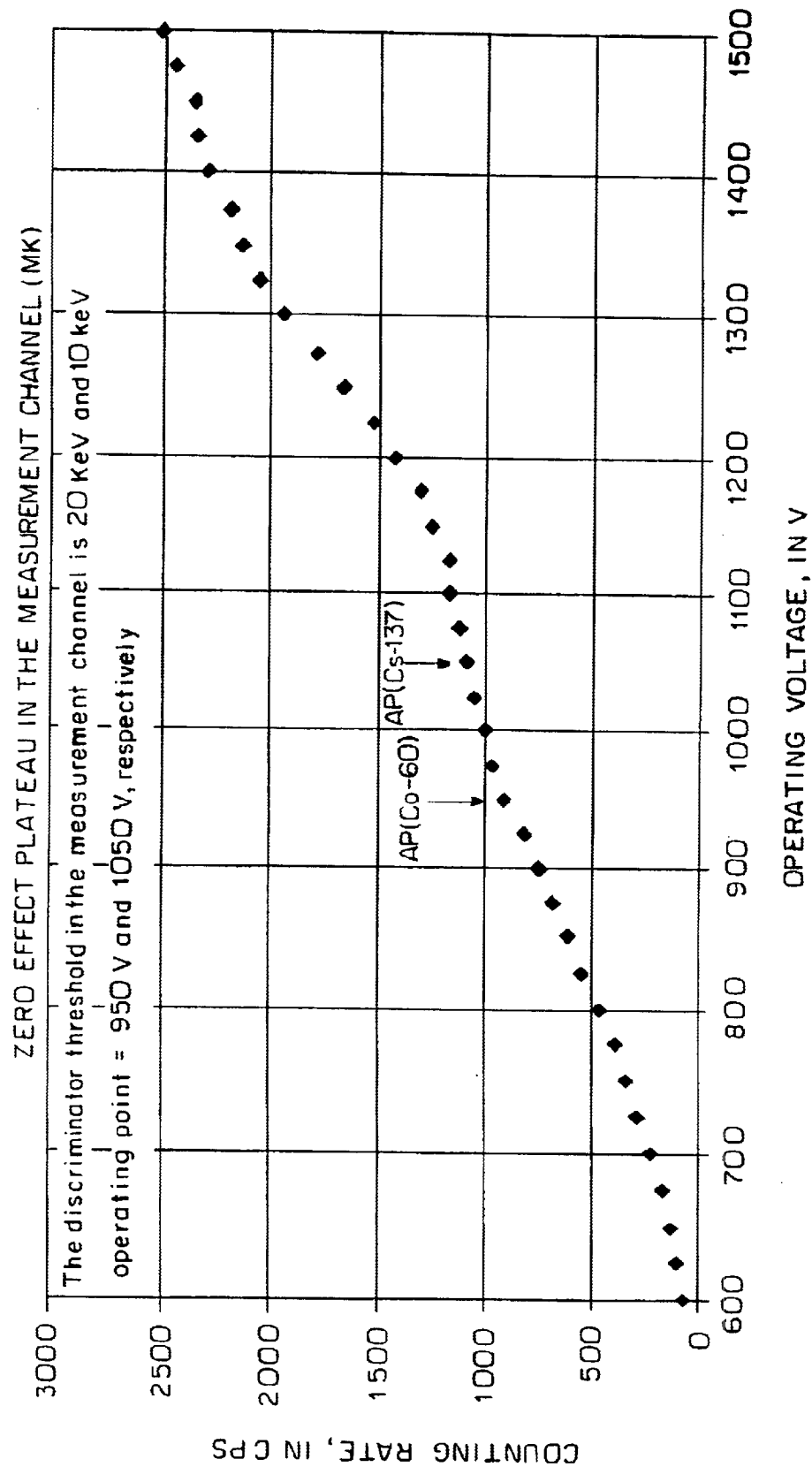
Figure 15:
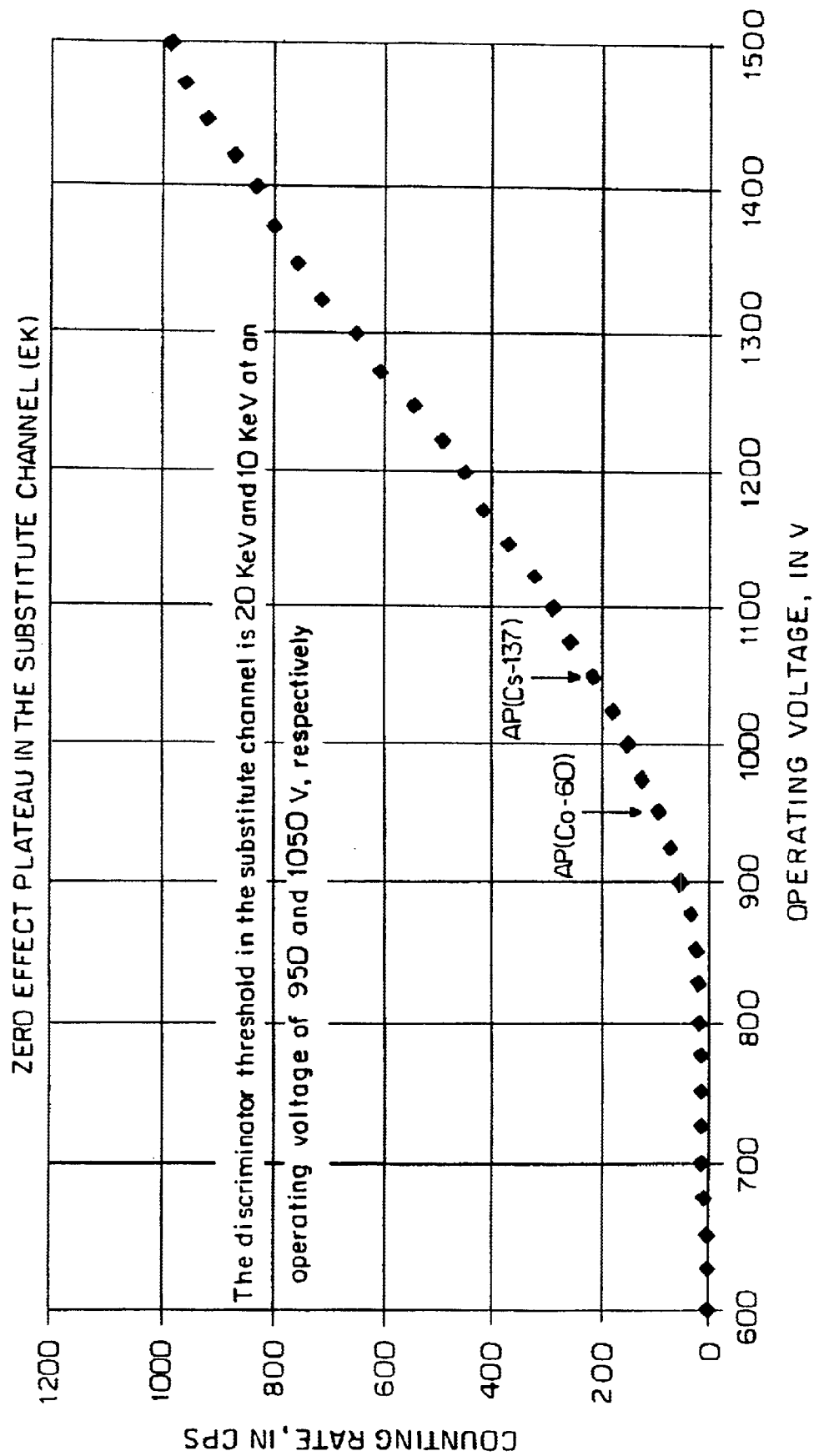
Figure 17:
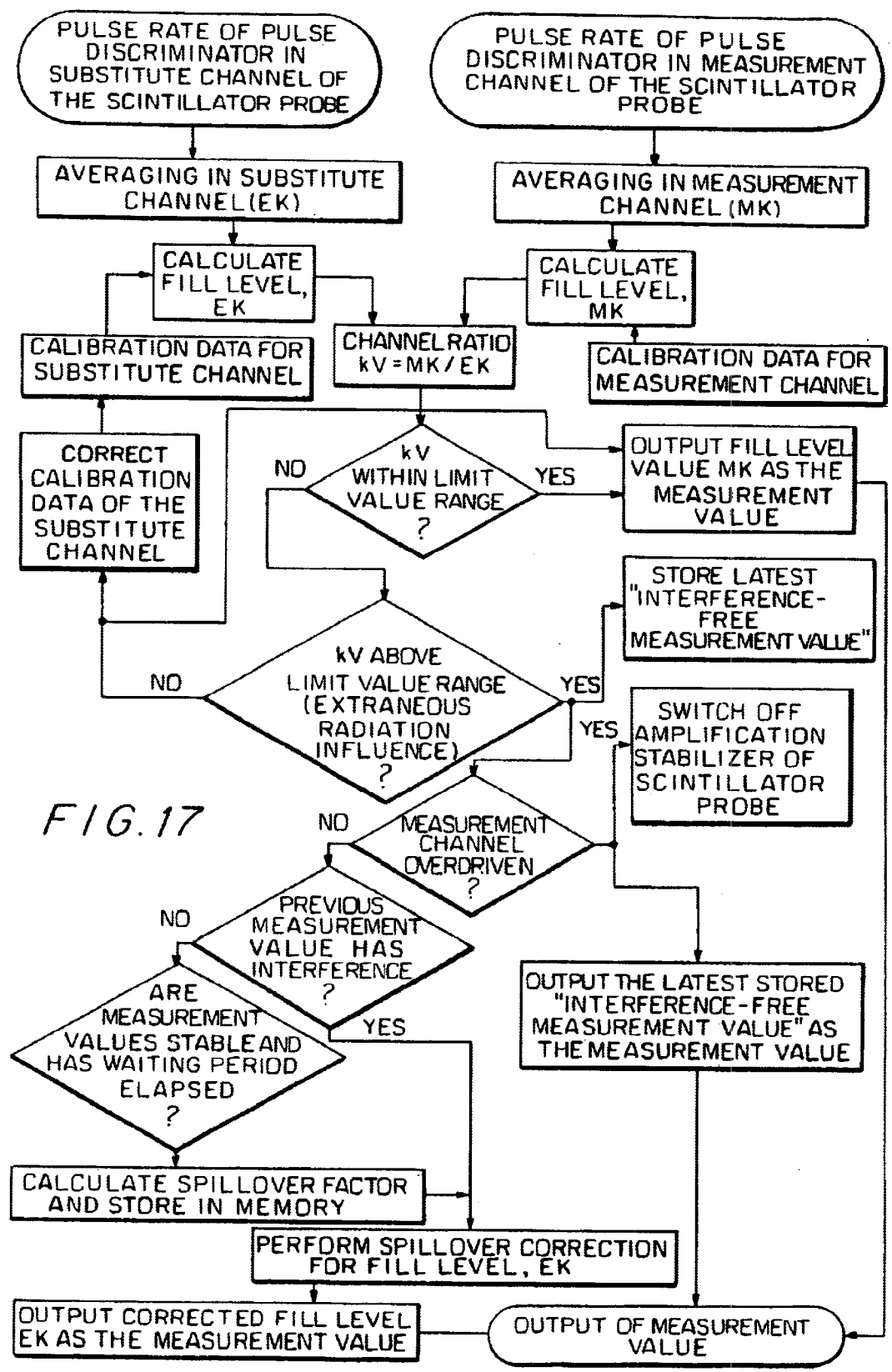
FIG. 17 is a flowchart showing the course of measurement for detecting extraneous radiation and outputting a measurement value for the fill level value furnished either by the measurement channel or the substitute channel.

The most important functions of the electronic unit 36, that is the required signal processing, for detecting and suppressing the extraneous radiation are shown in the flow-chart of FIG. 17. From the pulses at the outputs of the integral discriminators 30 and 31, mean values of the pulse rates are formed at intervals of 0.5 seconds and are transmitted to the evaluation device 7 (FIG. 1). This is where the actual averaging, required for smoothing the statistical fluctuations, is done. From these mean values, the fill level values for the measurement channel MK and the substitute channel EK are calculated periodically on the basis of the calibration data stored in memory, and the pulse rate ratio ZMK/ZEK (channel ratio) "measurement channel/substitute channel" is determined.

Figure 18:
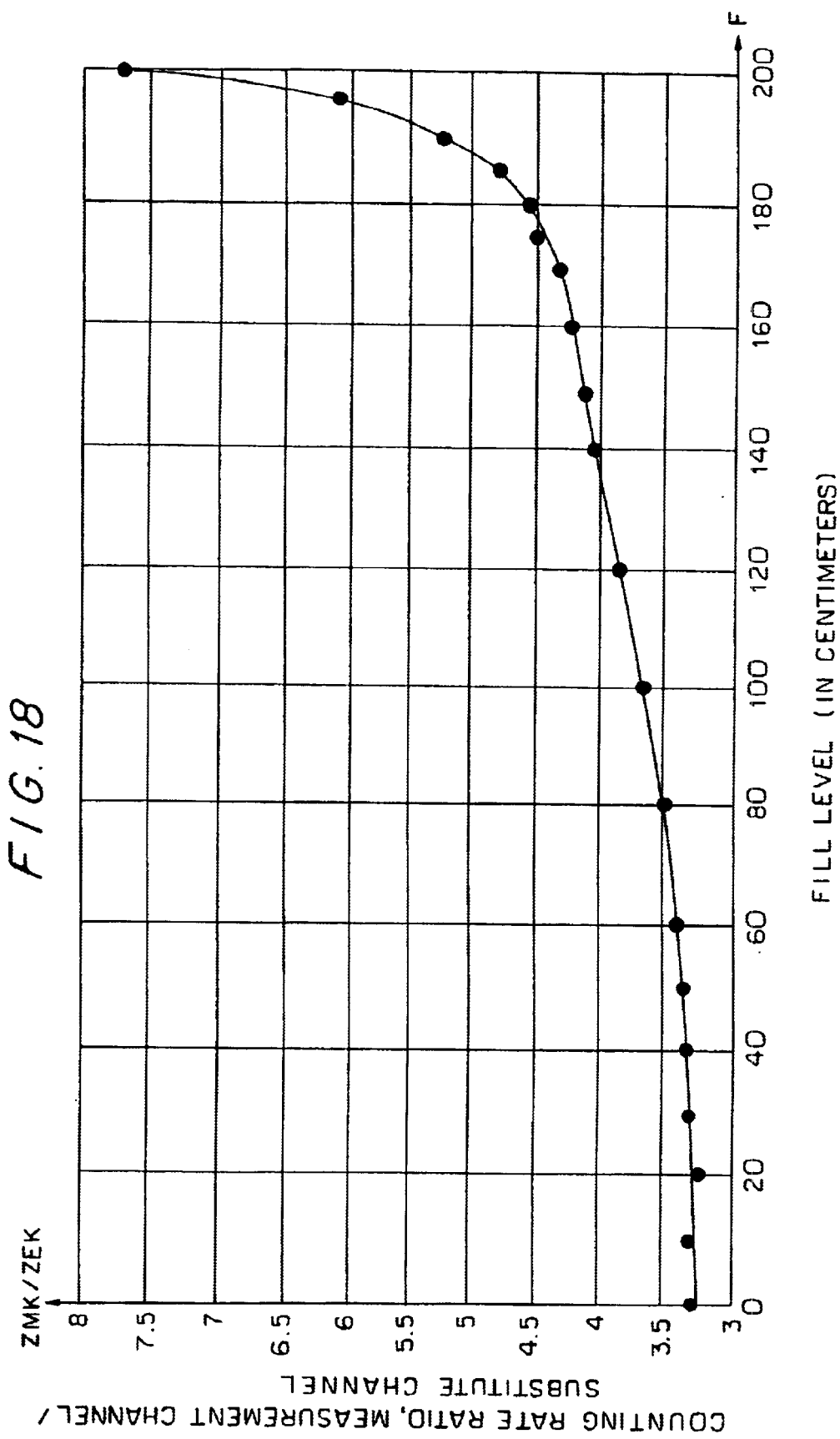
FIG. 18 is a diagram showing the counting rate ratio of the measurement channel/substitute channel as a function of the fill level F.

The channel ratio ZMK/ZEK, in unimpeded operation and with proper calibration, is always 1, at all fill level values. This is not the case, as FIG. 18 shows, if the channel ratio is referred to the pulse rates, because the form of the pulse height spectrum changes with the fill level.

If the channel ratio within a certain allowable bandwidth (for instance ±10%) is 1, then it is concluded from this that there is no extraneous radiation influence, and the fill level value ascertained in the measurement channel MK is output as the measurement value.

Conversely, if this ratio is outside this bandwidth, then it is concluded that an extraneous radiation influence is present, and the question is asked in which direction the limit value deviated:

If the value is higher than the upper limit value, i.e. exceeds the bandwidth in the positive direction, then it is concluded that there is no extraneous radiation influence; instead, the calibration of the substitute channel EK is defective, and the fill level value ascertained in the measurement channel MK is output as the measurement value. The calibration data of the substitute channel EK are also corrected accordingly.

If the value is below the limit value range, i.e. exceeds the bandwidth in the negative direction, then it is concluded that an extraneous radiation influence is present. In this case, the latest previous measurement value in a memory is retained. In addition, the question is asked whether the measurement channel MK is overdriven, that is if the pulse rate is above the usable pulse rate range, or if the anode current of the photomultipler has exceeded an upper limit value:

As long as an overdrive is occurring, the latest memorized "interference-free measurement value" is output as the measurement value. Moreover, the automatic amplification stabilizer is switched off; that is, the latest high-voltage value prevailing before the overdriven state is retained, as long as the overdriven state exists.

If no overdrive is occurring, then the question is asked each time whether the previous measurement value was impeded:

If the answer is "NO", then a certain stabilization time (corresponding to the length of time to be expected for the positioning of an extraneous radiator in weld seam testing operations) is waited out, and the question is asked whether the measurement value has stabilized. After that, the spill-over factor is calculated, and then the spillover correction is performed for the fill level in the substitute channel EK.

If the answer is "YES", then the spillover correction for the fill level in the substitute channel EK is performed immediately.

In both cases, after that the corrected fill level value for the substitute channel EK is output as the measurement value.

This application relates to subject matter disclosed in European Application Number EP 1105520.9, filed on Mar. 6, 2001, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . .", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A method for detecting and suppressing extraneous radiation influences in radiometric measurements in which measurements are performed over a useable pulse amplitude spectrum, comprising:

defining a measurement channel (MK) that extends at least essentially over the entire usable pulse amplitude spectrum of radiation pulses having a first pulse rate;

defining at least one substitute channel (EK) that encompasses only a fraction of the usable pulse amplitude spectrum of radiation pulses having a second pulse rate;

calibrating the measurement channel (MK) and substitute channel (EK) in terms of identical variables;

defining a relation between measurement values, defined by the respective pulse rates of the measurement channel (MK) and substitute channel (EK) such that a substantial variation from a nominal value occurs in the value of the relation when extraneous radiation is detected; and performing a radiometric measurement and determining the value of the relation for the measurement values obtained during the measurement so as to detect and suppress extraneous radiation influences.

2. The method of claim 1, wherein the relation is the ratio of the calibrated variables of the measurement channel (MK) and substitute channel (EK).

3. The method of claim 1, wherein the fraction of the usable pulse amplitude spectrum is above a substantial portion of the pulse amplitude spectrum of extraneous radiation.

4. The method of claim 1, wherein a significant variation in the value of the relation is defined by a first limit value above or below which an extraneous radiation detection signal is generated.

5. The method of claim 1 wherein when an extraneous radiation detection signal occurs, the substitute channel (EK) is utilized to form the measurement value.

6. The method of claim 1, wherein said radiometric measurement is performed to determine a fill level and said step of calibrating the measurement values of the measurement channel (MK) and substitute channel (EK) is effected by independent calibration functions each as a function of the fill level, such that at each fill level, the pulse rates of the measurement channel (MK) and substitute channel (EK) lead to the same measurement values when no extraneous radiation is present.

7. The method of claim 6, wherein the identical variables include one of fill level and fill volume.

8. The method of claim 1, wherein the relation is a ratio or difference.

* * * * *